(12) United States Patent  (10) Patent No.: US 7,819,408 B2
Shapiro  (45) Date of Patent: Oct. 26, 2010

(54) FOLD FLAT SUPPORT STRUCTURE ASSEMBLIES FEATURING SIMPLIFIED LATCHES AND RELEASES

(76) Inventor: Richard N. Shapiro, 1668 Dey Cove Dr., Va Beach, VA (US) 23454

( * ) Notice: Subject to any disclaimer, the term of this patent is extended or adjusted under 35 U.S.C. 154(b) by 713 days.

(21) Appl. No.: 11/891,024

(22) Filed: Aug. 9, 2007

(65) Prior Publication Data

US 2009/0039217 A1  Feb. 12, 2009

(51) Int. Cl.
*B62B 1/00* (2006.01)
(52) U.S. Cl. .............................. 280/47.315; 280/47.34; 280/297
(58) Field of Classification Search .................. 280/30, 280/47.35, 47.34, 47.315, 292, 297, 298, 280/646, 648, 651, 87.01; 16/115, 263, 386, 16/429; 248/589, 611, 125.8, 407, 503
See application file for complete search history.

(56) References Cited

U.S. PATENT DOCUMENTS

| | | | | | |
|---|---|---|---|---|---|
| 2,984,499 | A | * | 5/1961 | Humphrey | ............... 280/47.18 |
| 4,744,575 | A | * | 5/1988 | Tonelli | .................... 280/87.01 |
| 4,887,836 | A | * | 12/1989 | Simjian | ...................... 280/651 |
| 5,004,254 | A | * | 4/1991 | Wu | ........................ 280/47.315 |
| 5,538,267 | A | * | 7/1996 | Pasin et al. | .............. 280/87.01 |
| 5,911,263 | A | * | 6/1999 | Wu | ............................. 16/429 |
| 6,220,611 | B1 | * | 4/2001 | Shapiro | .................... 280/47.34 |
| 6,581,945 | B1 | * | 6/2003 | Shapiro | ........................ 280/30 |
| 6,893,030 | B2 | * | 5/2005 | Shapiro | .................... 280/47.34 |
| 6,916,028 | B2 | * | 7/2005 | Shapiro | .................... 280/47.34 |
| 6,991,249 | B2 | * | 1/2006 | Shapiro | ...................... 280/648 |
| 7,000,939 | B2 | * | 2/2006 | Shapiro | ...................... 280/646 |
| 7,231,755 | B2 | * | 6/2007 | Clarke | .................. 280/47.315 |

* cited by examiner

*Primary Examiner*—Hau V Phan

(57) ABSTRACT

This application discloses movable, stowable support structure assemblies for supporting an article or receptacle. The support structure assemblies may include simple manually manipulable latches, which the user simply presses to release the support structure assembly, and upon release the support structure assembly is pivoted and movable to a fold flat profile within the perimeter and the side elevational profile of the article or receptacle, and may include spring biasing. The application provides for simple internal mechanisms, for unique faceplates with finger grips, and also provides for spring biasing and latching of the support structure assembly so that it automatically is retained in the fold flat profile. The support shaft may have mounted thereon either a ski, sled, or a wheel, as well as a typical stationary support stand shaft foot.

23 Claims, 6 Drawing Sheets

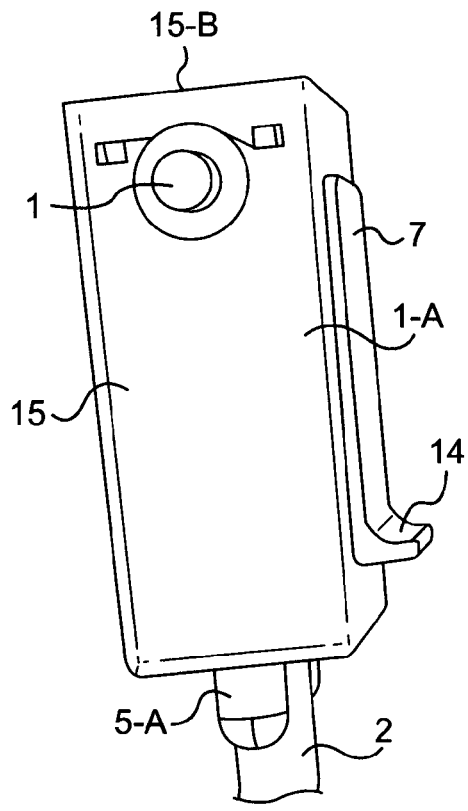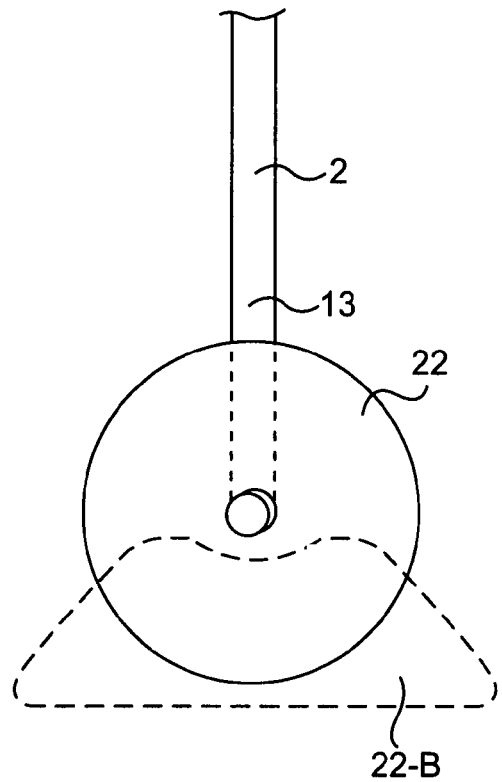
FIG. 5
FIG. 5A
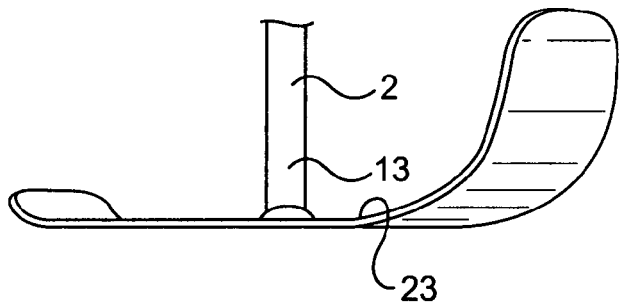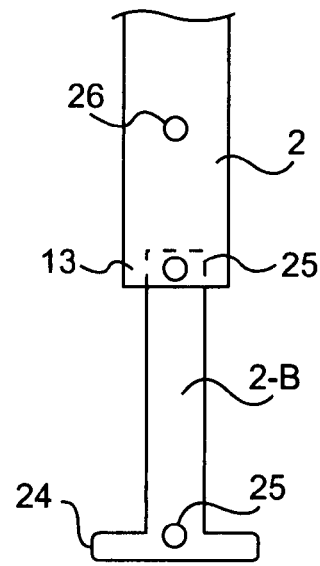
FIG. 5B
FIG. 5C

FOLD FLAT SUPPORT STRUCTURE ASSEMBLIES FEATURING SIMPLIFIED LATCHES AND RELEASES

RELATIONSHIP TO OTHER APPLICATIONS

This application applies to movable and stowable fold flat support structure assemblies with support shaft stands, that engage a horizontal surface supporting the article in a spaced relationship thereto, adaptable to a wide array of articles and receptacles, and provides conversion options to apply various attachments to the support structure assembly shafts. U.S. Pat. No. 7,066,485 is a prior United States patent granted to this inventor, which applied to wheeled vehicles with movable and stowable wheels. This application discloses and refines "fold flat" support structure assemblies for articles and receptacles, and includes selectively removable attachments so that the support structures shafts rotate 360 degrees along a vertical shaft axis and may attach skis, sleds, wheels as well as provides for fixed position support shafts with stands which extend and retract.

FIELD OF THE INVENTION

This application relates to novel support structures which may be folded into a flat profile inside and/or closely adjacent to an article or receptacle, widely applicable to support structures in United States class 248, and its international class equivalent. The support structure assemblies provide for a shaft, mounted to an article, generally perpendicular to the ground surface in an operative position, including several simple mechanisms described in the application that allow the support structure assembly to be rapidly and conveniently moved and compactly stowed along one or more pivot structures, so that the support structure assembly and support shaft is in a plane near to parallel with the perimeter of the horizontal frame of the article. Accordingly, the support shaft and support structures disclosed provide for a compact stowed position of the support structure assembly, within the perimeter of the horizontal frame and side elevational profile of the article. These support structure assemblies are widely applicable to stationary objects, articles and receptacles, as well as to vehicles with running gear, wheels, or skis.

BACKGROUND OF THE INVENTION

The applicant's United States patent applications, including but not limited to U.S. Pat. Nos. 7,066,485 and 6,893,030 applied numerous types of stowable wheel structures to wheeled devices, among other innovations. However, this application both improves upon and expands on the applicability of the stowable support structures to movable or stationary articles or receptacles, including support shafts that are convertible to a variety of articles, as well as movable articles or vehicles.

SUMMARY OF THE INVENTION

This application provides for compact, stowable "fold flat" support structure assemblies that include a support shaft stand. Several of the improvements in this application relate to simple user finger grips for support structure assemblies, for simple latch mounting on the support structure assembly shafts, for the spring biasing of the entire support assembly so that it "automatically" moves to the stowed position inside the perimeter of the horizontal frame of the article, alternate applications of applying shock absorbing features to the support structure assembly shaft and other novel concepts that will become apparent from the descriptions below.

One of the purposes of the invention is to provide for a very simple user grip, which is simply a formed portion of an exterior protruding part of the support structure assembly, so that the user may simply use a number of fingers to manipulate the grip portion to release a latch portion of the support structure assembly, thereby permitting movement of the support structure assembly from the operative, use position, to a compact, stowed position where the support structure assembly is located within the perimeter of the frame perimeter of the article, receptacle or vehicle, and also within the side elevational profile of the article, receptacle or vehicle.

Another object of the invention is to provide for a simple method of manufacturing the internal components of the movable support structure assembly, so that there is a basic support shaft stand, a simple support structure assembly latch, a pivot (or two oppositely extending mounting elements) and a simple user finger grip interface or faceplate that interacts to release the latch.

Another object of the invention is to provide for unique means so that the "faceplate" or user manipulable grip of the support structure assembly resiliently connects to other portions of the support structure assembly so that the faceplate may or may not require screws or any parts separate from the faceplate, and the faceplate may include a finger grip that interconnects to a portion of the latch, thereby forcing the latch into a released position by suitable manual movement of a portion of the finger grip.

Another object of the invention is to provide for simple spring biasing of the pivot of the support structure assembly or any other structure of the support structure assembly, so that once the user releases the latch means, or finger grip, the support structure assembly and stand, by spring biasing, automatically moves to the stowed, compact position inside the perimeter frame and side elevational profile of the article, receptacle or vehicle.

Another object of the invention is the unique method by which the support structure latch interconnects to the support structure or shaft, and a portion of the latch includes at least one finger which may/may not be spring biased, which latch finger latches to a portion of the article, receptacle or vehicle planar surface and a bottom portion of the support structure assembly, by traveling through a corresponding hole or opening in the planar surface.

Another object of the invention is to provide for shock absorbing means for the support shaft structure of the support structure assembly.

Another object of the invention is to provide unique means for the support shaft to interconnect to the pivot portion.

Another object of the invention is to provide for alternate methods which latch the support structure assembly against movement to the stowed position, including several alternate concepts, which either prevent the movement of the faceplate or finger grip portion, or prevent movement of the latch along the support shaft, or by latching the pivot against pivoting movement.

Another object of the invention is to provide secondary engineering latch structures to the support structure assembly, thereby providing that if the faceplate or user grip was to break, the user may still release the support structure assembly by moving a second or alternate portion of the support structure assembly latch and manipulating what are referred to as the secondary finger grip portions.

Another object of the invention is to provide for at least one open recess in a support case of the support structure assembly, which provides access to the secondary finger manipulable portions or grips of the latch as described in the application.

Another object of the invention is to provide that the support structure assembly disclosed herein may have conversion options transforming the article or receptacle from a stationary article or receptacle, to a moving vehicle, such as a wheeled vehicle or a ski or sled type vehicle.

Another object of the invention is to provide that the shaft of the support structure assembly may be movable and extensible and retractable, and when a wheel is attached to the support shaft, there is also a second convertible method where a wheel chock or stand may be selectively attached or removed from a wheel.

Another object of the invention is that once the support structure assembly is in the stowed, compact position, the user may move the support structure assembly back into the operative, use position by merely manually moving the support structure assembly shaft or support case, pivoting it out of the interior of the perimeter frame, and then "automatically" latching it again in the operative position without the user being required to manipulate any further latch.

Another object of the invention is to provide for a method where the lowest planar surface of the article, receptacle or vehicle, has a cavity or space that accommodates the generally longitudinal support shaft stand of the support structure assembly when situated in the operative position.

Another object of the invention is to provide that the support shaft, lowest portion, features conversion options to allow for the selective placement of a wheel stand or chock onto a wheel, or a retractable and extensible stand shaft, which may include a foot portion for engaging the ground surface.

An alternate embodiment of the support structure assembly, 1-B, details an alternate latching system for the support structure assembly, with at least one latch which engages latitudinal to the article frame, and which may integrate the spring biasing spring of the invention into a unitary construction with the latch finger grip.

Another object of the invention is to provide for simple shaping of the support stand shaft so that that support stand shaft either rotates 360°, along its vertical axis, or maybe fixated, by virtue of the shaft stand's shape in relation to a corresponding shaped portion of the support structure assembly components, or of the support structure case. These features may be appropriate, where it is desired that a series of support stands maintain a fixed position, whereas a series of other support stands rotate along a vertical axis.

BRIEF DESCRIPTION OF THE DRAWINGS

FIG. 5 is an end elevational view of a support structure assembly 1-A, exploded away from the perimeter frame structure of the article or receptacle, showing one embodiment of a finger grip mounted to a support structure assembly case;

FIGS. 5-a, 5-b, 5-c show alternate attachments to the support structure assembly shaft, including a fixed foot portion, a ski or sled, and a wheel with a removable wheel chock or stand.

DESCRIPTION OF THE PREFERRED EMBODIMENTS

Figure 1:
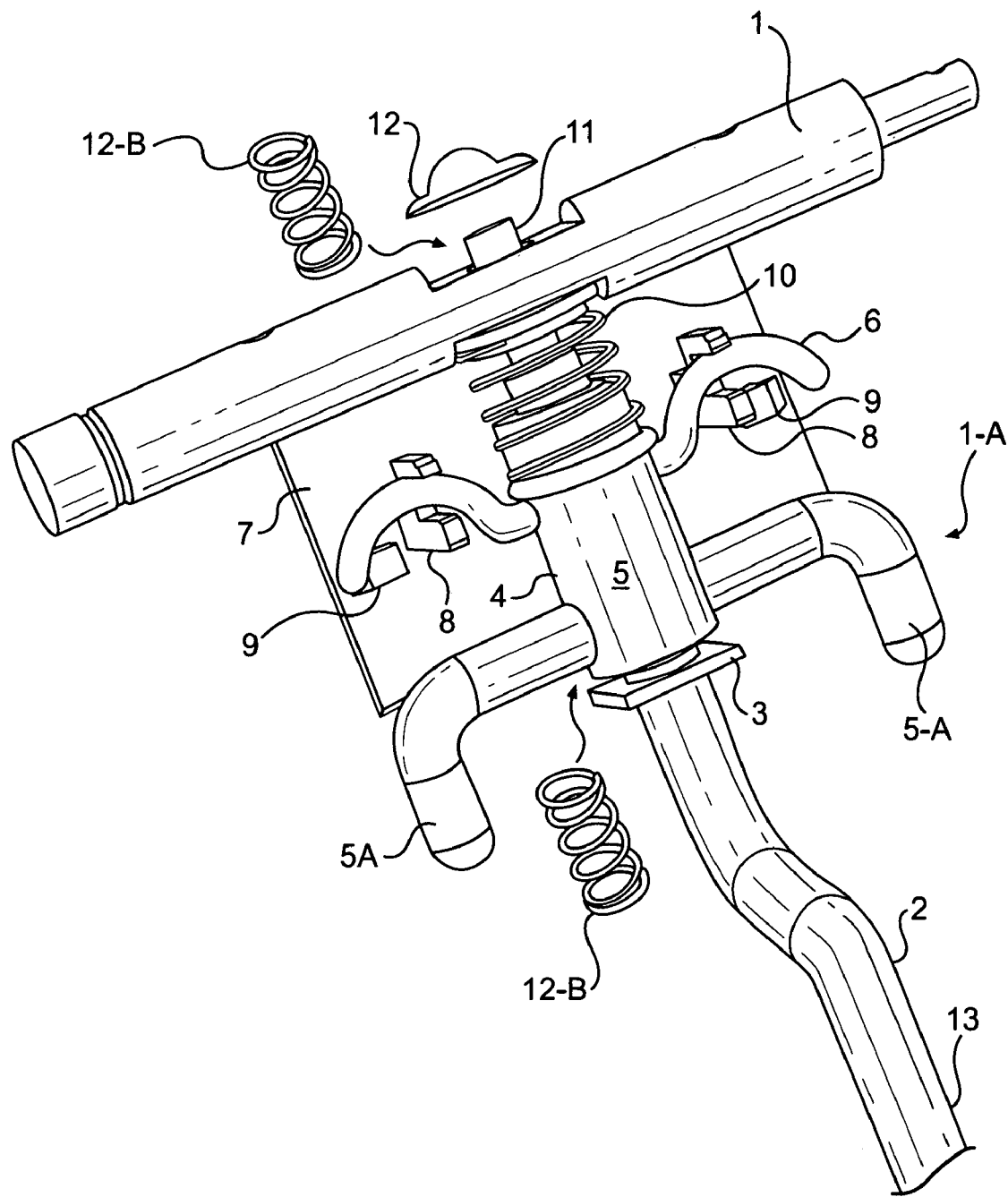
FIG. 1 is a side elevational partially cut away view of internal mechanisms of the support structure assembly 1-A, with no support case or article frame structure shown.

Referring to the drawings, the following are descriptions of the numbered elements: 1-A—support structure assembly; 1-B—alternate support structure assembly; 1—pivot; 2—support shaft; 2-b, support shaft second stage, 3—support shaft shaped washer; 4—support latch; 5—latch; 5-a—latch fingers; 5-b—alternate latch and grip; 5-c—alternate latch finger; 6—latch secondary finger grip; 7—latch faceplate primary release; 8—latch faceplate connectors; 9—latch faceplate retaining clips; 10—latch spring; 11—support shaft upper end; 12—terminal fixing member; 12-B—alternate shock absorbing member; 13—support shaft-lower portion; 14—latch faceplate release finger grip; 15—support case; 15-B—support case cover; 16—article perimeter frame; 17—article lower planar surface; 17-B—article surface receiving hole; 17-C—article surface receiving cavity; 18-A—faceplate sliding lock; 18-B—faceplate lock to shaft; 18-C—pivot lock; 19—pivot recess; 20—pivot spring biasing spring; 21—support case access holes; 21-b—support case access hole notched areas; 22—wheel; 22-B—removable wheel chock/stand; 23—ski; 24—support shaft foot; 25—support stand adjustable detente or screw; 26—male-female adjustable members.

Figure 2:
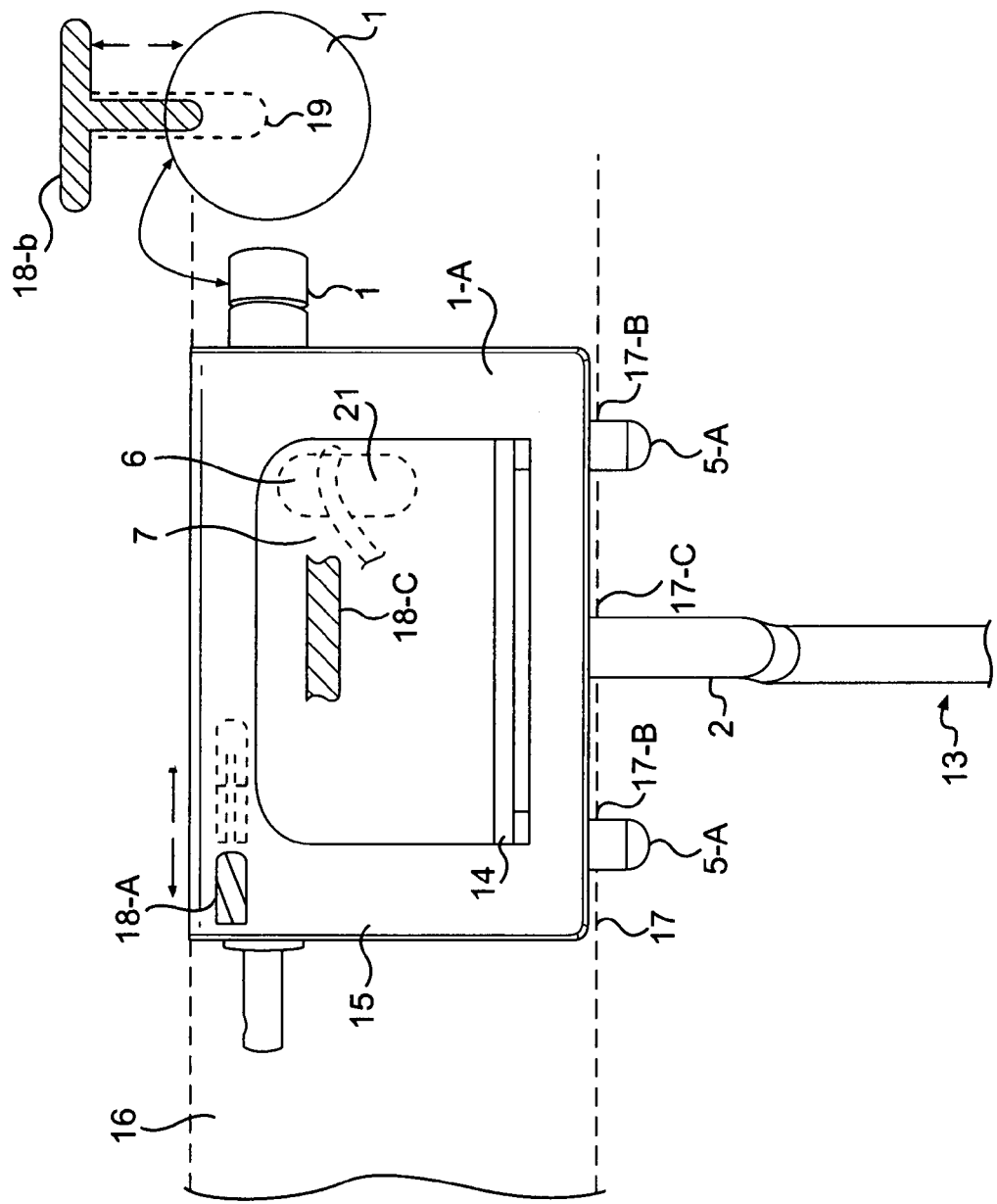
FIG. 2 is a side elevational profile of the support structure assembly 1-A, from the exterior of the article or receptacle, showing the support structure assembly in the operative position with the article perimeter frame cutaway and not shown, the figure also shows multiple alternate locking or latch structures to prevent release of the support structure assembly.

Referring first to FIGS. 1 and 2, the movable and stowable support structure assembly is shown. In FIG. 1, there is shown a pivot, 1 (instead of a solid single pivot, oppositely extending mounting elements may be employed that may form a portion of the support case, 15, which case is shown in further detail in FIG. 2). The pitted structure, 1, at either end is mounted into a portion of the article horizontal frame 16, not shown here. As seen in both FIGS. 1 and 2, a generally longitudinal support shaft, 2 interconnects with that pivot, and is connected to that pivot by virtue of a terminal fixing member, 12. However, before the support shaft, 2, is connected to that pivot, 1, a latch, 5 is mounted to the support shaft, 2. In the embodiment shown in FIG. 1, the latch surrounds the support shaft, 2 which travels inside a hollow portion of the latch, 5. Also, in FIG. 1 is shown a spring, 10, which mounts around the support shaft, 2 between the pivot, 1 and the latch, 5. The purpose of the spring, 10, is to direct the latch member, 5, downwardly, so that the latch fingers, 5-a, travel into matching holes 17-b or recesses in the article or receptacle lower planar surface, 17, indicated in FIG. 2. When the support structure assembly is in the operative position supporting the shaft, 2 one or more downwardly directed latch fingers, 5-a, occupy the matching holes of the lower planar surface, 17, and in the embodiment shown in FIG. 1, the support shaft, 2 may also occupy an article surface receiving cavity, 17-c. Alternatively, the male-female relationship above may be reversed (not shown) and the fingers may be mounted to a planar surface of the article, and may travel into female recesses in the support structure assembly.

FIG. 1 also shows that the latch, 5 also includes two latch secondary finger grips, 6—although instead of a pair of these secondary finger grips, it is appreciated that a single more central grip may instead be employed, which is mounted to and/or incorporated as part of the latch, 5. As shown later in FIG. 4, the support structure assembly case, 15, may include a pair of support case access holes, 21, which allow access to these secondary latch finger grips, 6. Accordingly, the user may reach their fingers inside the access holes 21 (see FIG. 4) to manipulate the latch secondary finger grips, 6. However, referring back to FIG. 1, the support structure assembly includes a latch faceplate primary release, 7 but a support case, 15, is not shown. The latch faceplate primary release 7, is on the interior facing side of the faceplate and includes a pair of latch faceplate connectors, 8, which are positioned to surround (or interconnect to) the corresponding pair of latch secondary finger grips, 6. Accordingly, as is better seen in FIG. 2, the exterior facing side of the latch faceplate primary release, 7, includes a latch faceplate release finger grip shaped portion, 14. To operate, and release the support structure assembly, 1-A, the user manipulates the shaped finger grip portion. 14, of the latch faceplate primary release, 7, in an upward direction, against the spring biasing of spring, 10, which raises the latch and its downwardly directed latch fingers, 5-a, upwards out of the matching holes in the article lower planar surface, 17, and the receiving holes, 17-b, thereby freeing the support structure assembly 1-A, which then is movable and pivotable along the pivot 1 and in to the perimeter frame, 16 and side elevational profile of the article or receptacle.

Referring to the face plate shown in both FIGS. 1 and 2, in this embodiment, the face plate is mounted to the exterior of the support structure assembly case, 15. The unique mounting method of the faceplate is achieved by virtue of two latch faceplate connectors, 8, shown in the inward directed side of the faceplate, 7. Referring again to FIG. 4, the support case access holes, 21, each have a small notch, 21-b, which correspond to the faceplate retainers, 9, and allow for the retention of the faceplate to the support structure assembly 1-a. During assembly, the faceplate slides through the notched areas (the two latch retainers are pushed through the notched out areas, 21-b, and then the faceplate is free to slide downward in relation to the support case, 15. The latch member, 5 is placed inside the (optional) support case 15, then the support shaft, 2 is placed longitudinally upwards through the latch, 5 through the spring, 10, and through a central hole in the pivot (not shown in FIG. 1) and the support shaft upper end, 11 is connected to the pivot, 1, by a terminal fixing member, 12.

Referring also to FIG. 1, shock absorption may be added to the support structure assembly, 1-a. At the upper end of the support shaft, 11, may be added a spring or similar dampening or shock absorbing member, 12-b. Additionally, or alternatively, the shock absorption may be mounted with a spring or shock absorbing material, 12-b, between a suitably shaped washer like portion 3 of the support shaft, 2, and the underside of the latch, 5, or the underside of the support case, 15, if the case 15 is used as shown in FIG. 2. FIG. 1 shows a generally round support shaft, 2 however, this is illustrative. The support shaft may be any suitable shape. A pair of latch 5 downwardly directed fingers 5-a are shown. However, single or multiple downwardly directed fingers may be mounted centrally on the latch, 5 instead. Some portion of the latch finger is captured in a suitable recess or hole in the article planar surface, 17 as shown in FIG. 2. The faceplate, 7 may instead have a single central connector to any suitable portion of the latch, 5, rather than the pair of grips, 6.

Referring to FIG. 2 the support structure assembly 1-A is shown in a side elevational profile, from the exterior. FIG. 2 clearly shows the downwardly directed fingers, 5-a, as well as the support shaft, 2 in relation to the article lower planar surface, 17. FIG. 2 also shows a ghost perspective of the article perimeter frame, 16, and how the oppositely extending mounting element/pivot is captured in any suitable portion of the perimeter frame, 16. FIG. 2 also shows three alternative methods for secondary locking of the support structure assembly against release. First, element 18-a details a simple finger grip that is slidable latitudinally along a portion of the support case face, 15. By sliding the finger grip, 18-a, into an orientation above the faceplate, 7, the finger grip 18-a serves to prevent motion of the faceplate, 7 which ultimately also blocks movement of any part of the latch 5 from the operative, latched position. Accordingly, this sliding element. 18-a prevents release of the overall support structure assembly latch 5 by blocking the motion of the faceplate, 7. Another alternate locking element is shown at 18-b, which locking element presses into a shaped cavity, 19, in the pivot, 1, essentially preventing rotation of the pivot.

Any suitable male-female protrusion may be employed between the pivot 1 and a separate component, whether mounted to the frame 16, the case, 15, case cover, 15-b or to the support structure assembly 1-A. The locking method may be secondary or primary, and if primary would replace the other primary latch, 5 shown here.

The third alternative or secondary locking is shown at element 18-c, which is a shaped finger grip mounted to the faceplate, 7. An inwardly directed portion of this finger grip serves to block movement of the faceplate, 7, by stopping/blocking the latch from moving upwards on the support shaft, 2, unless the finger grip is first manipulated slightly in outward direction from the support shaft. Although not shown, this locking method may instead be designed where the user depresses inwardly instead, so long as the function is that the component blocks any movement of the faceplate, 7 and/or the latch, 5, along the support shaft. FIG. 2 also shows, in ghost perspective, one of the finger access holes, 21, oriented under the faceplate, 7. If the face plate for any reason is removed or breaks off, the support structure assembly is fully functional by virtue of the user manipulating the latch secondary finger grip, 6, in an upward direction. Although the faceplate, 7 is shown mounted to the exterior of the support case, 15, the faceplate may instead be mounted to the interior of the optional support case, 15. The shaping of the faceplate, 7 may slightly be changed for the interior mounting, and an open cavity would be formed in one or more portions of the support case, 15, to allow the finger grip portion 14 of the faceplate to protrude outward from the support case, 15, exterior wall.

Referring once again to FIG. 1, is shown a square shaped portion, 3, mounted along the support stand shaft, 2. The purpose of the square shaped portion, 3, is to provide for the fixation of the support stand shaft, 2, against rotation along its vertical axis. Referring to FIG. 2, this view shows the support stand assembly including a case, 15. At the point where the support stand shaft enters into the bottom of the support structure assembly case, 15, is a corresponding shaped opening (not shown) and therefore the support stand shaft is prevented from rotation along its vertical axis. With the minimal change of the shape of the washer portion, 3, the support stand shaft, 2 may be caused to rotate along its vertical axis, by simply reducing the size of the washer portion, 3, and changing its shape to round. Accordingly, the support stand shaft, 2, may rotate 360° along its vertical axis as no part of the support stand shaft, 2, would be fixated against movement in relation to the support structure assembly case, 15. Also, an alternative method of providing for 360° rotation as opposed to fixation of the support stand shaft, 2, is that the square shaped washer portion, 3, shown in FIG. 1, may be omitted. Instead the portion of the support stand shaft, 2, that travels through the pivot, 1, at its upper portion, 11 (in FIG. 1) may be shaped with a suitable portion that corresponds with a matching shaped portion of the hole in the pivot, 1, through which the support stand shaft, 2, travels before placement of the terminal fixing member, 12. This particular alternate method may be appropriate where there is not a completely enclosed support case, 15.

Figure 3:
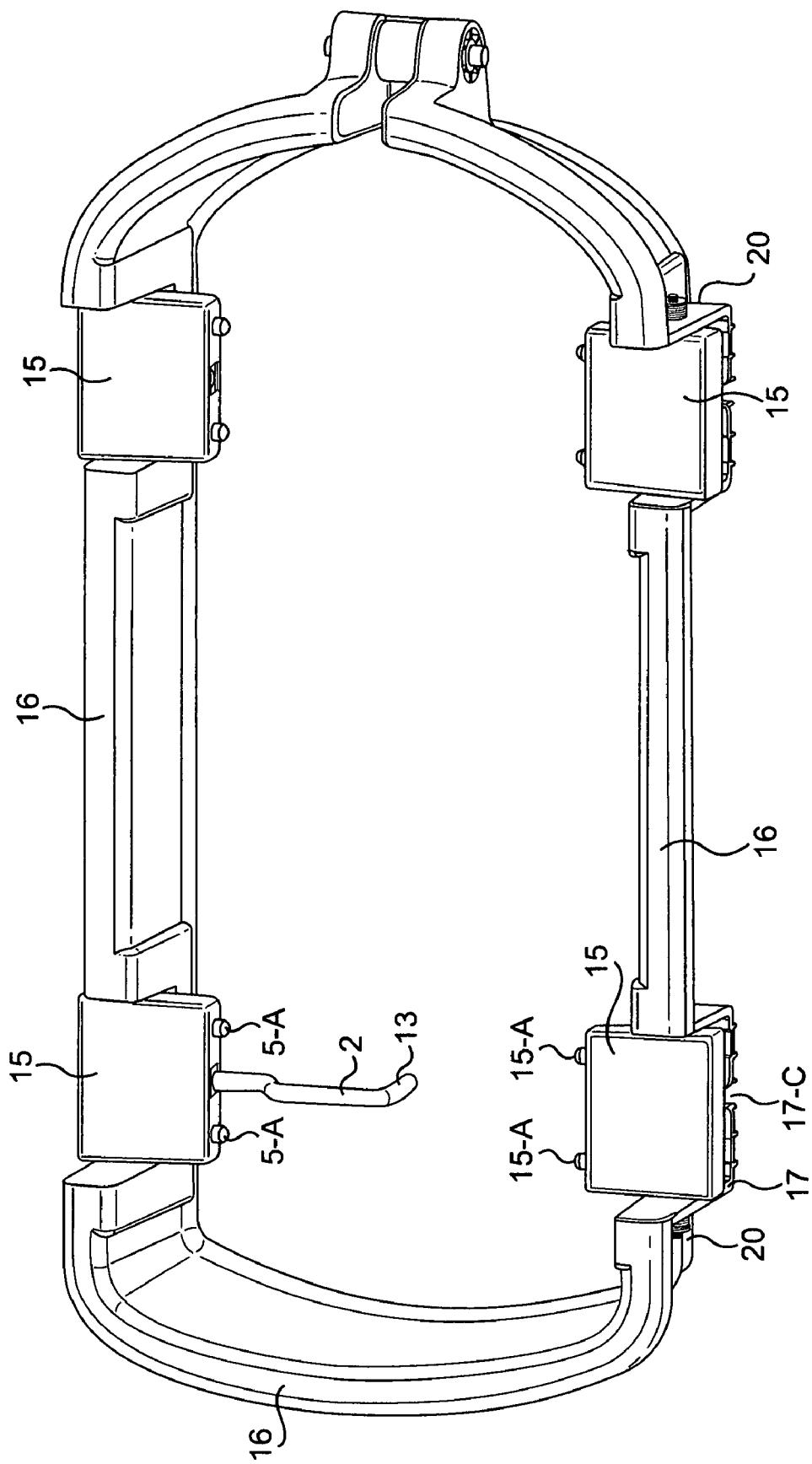
FIG. 3 is a top plan view of a series of four support structure assemblies mounted to an article or receptacle, with the support structure assemblies in the fold flat or stowed position, lacking the support structure assembly shafts, except on one of the four assemblies depicted.

FIG. 3 shows a series of four support structure assemblies, 1-A indicated by cases 15 stowed inside the perimeter and side elevational profile of the article perimeter frame, 16. Each of the support structure assemblies, 1-a, with the exception of the support shaft, 2, are situated within the support structure case, 15. Protruding from the bottom of each case, 15, are the downwardly directed fingers, 5-a, and one of the four support case assemblies shows a support shaft, 2 and its lowermost shaft end, 13. Also visible is the lower planar surface, 17, and the open cavity 17-c which allows the support shaft 2 to reach the operative position as shown elsewhere. FIG. 3 shows the reverse side of the support cases, 15, and the opposite (not visible) face side of the support case has either of the open access holes, 21, and/or includes the latch faceplate primary release, 7 (not shown).

Figure 4:
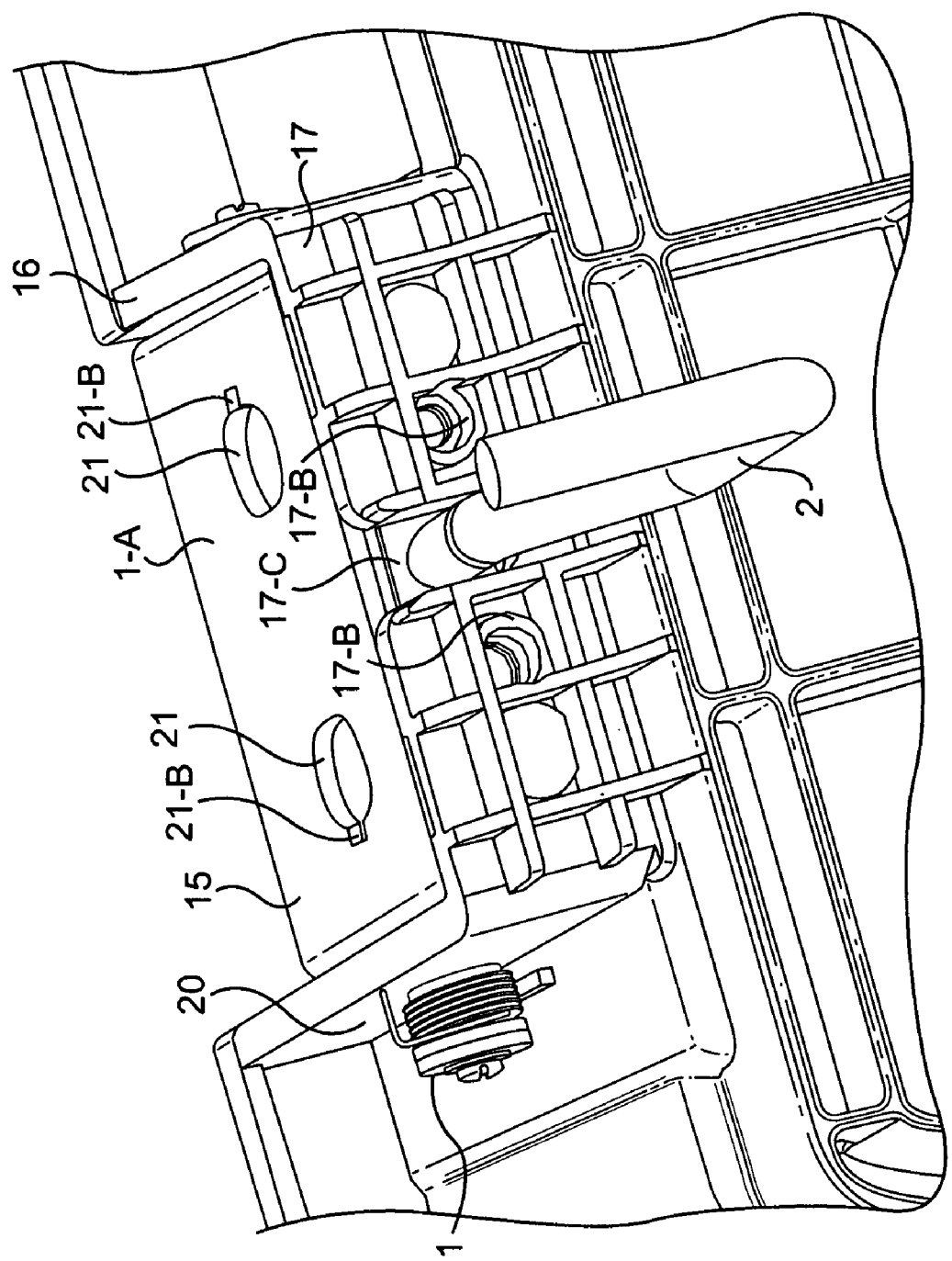
FIG. 4 is a partially cutaway view of an underside perspective of the article or receptacle showing the support structure assembly in an operative position without a face plate mounted on the support structure assembly 1-A, showing one embodiment of a support shaft.

FIG. 4 details a single support structure assembly, 1-a lacking a latch faceplate release, 7, in the operative position, with a support shaft, 2 extending in a downward direction through an open cavity, 17-c, through the article surface receiving cavity. The article lower planar surface, 17 is shown just under the support structure assembly, 1-a. There is shown a pair of holes 17-b through the article lower planar surface, 17, which holes are designed to receive the downwardly directed latch fingers, 5-a, described elsewhere. FIG. 4 also shows that at one side of the oppositely extending mounting elements or pivot, 1, a spring biased latching spring, 20, may be mounted. In operation, when the user effects release of the latch, 5, releasing the support structure assembly latch fingers, 5-a, by upward movement, this spring, 20, causes the entire support structure assembly, 1-A, to pivot and move through an angle and motion causing the support structure assembly and its shaft to be situated entirely inside the perimeter of the article frame, 16, within the side elevational profile of the article or receptacle. FIG. 4, at the area of the finger access holes, 21, also shows the small notches, 21-b, which provide for no screw connection of the latch faceplate primary release, 7, which is connected to the case 15, as described in FIGS. 1 and 2 earlier. Other methods of attaching a faceplate with a finger grip may be employed. The faceplate 7 may be mounted interior of the support case, rather than completely exterior as described. Other methods of exterior mounting the faceplate may be employed including other resilient methods that do not require separate pins or screws. Also, regarding the spring biasing method depicted relating to the pivot spring 20 in FIG. 4, it may be unnecessary to use a spring biasing spring, or the spring biasing may be mounted in other locations besides the one shown along the pivot, 1.

FIG. 5 shows an end elevational view of a support structure assembly, 1-a, including a support case, 15, which surrounds the main internal components. Although this view clearly shows the latch faceplate primary release, 7 along with its shaped finger grip, 14, mounted to the support case, 15. The downwardly directed support shaft, 2, as well as one of the downwardly directed latch fingers, 5-a is shown.

Associated FIGS. 5-a, 5-b, and 5-c show various alternate features that may be mounted to the support shaft, 2. First, FIG. 5-a shows a wheel, 22, connected to the lower shaft portion, 13. A support structure assembly, 1-a, as shown in this application may have mounted to the shaft, 2, at least one wheel, 22, and any suitable number of support structure assemblies as may be necessary for the article to become a vehicle with rolling movement. Also FIG. 5-a shows a ghost perspective of a wheel stand or wheel chock, 22-b, which may be selectively interconnected to the wheel, 22 to make the support structure assembly support shaft non-rolling/stationary. FIG. 5-b details that the support shaft, 2, may have mounted at the lower portion of the shaft, 13, a ski or sled, 23. Again, any suitable number of the support structure assemblies, 1-a, may employ a ski or sled attachment to the support shaft, 2. FIG. 5-c details that these support shafts, 2, they have more than one stage, and may have at least one additional stage, depicted as 2-b, and they may have a ground engaging foot, 24 of any suitable shape or type. Any suitable method may be employed to allow for the extension and retraction of the at least one additional secondary support shaft stage, 2-b, which may extend or retract with typical detentes, 25, with male-female adjustable members, 26, or simple thumbscrews may be employed (not shown) or any other fixing members commonly known in the art. It is also evident that several of the various attachments shown in these figures may be interchanged in a way that would allow the removal of a ski, and the attachment of a wheel, or allow for the changing of a stationary structure such as shown in FIG. 5-c, to either a ski or a wheel. Further, the entire support structure assembly shaft, 2 may be changed by removal of the fixing member, 12, thereby allowing the support shaft, and one of the attachments shown in FIG. 5-a, 5-b, or 5-c, and a different type of the support shaft, with a differing shape, may be employed with a different attachment.

Figure 6:
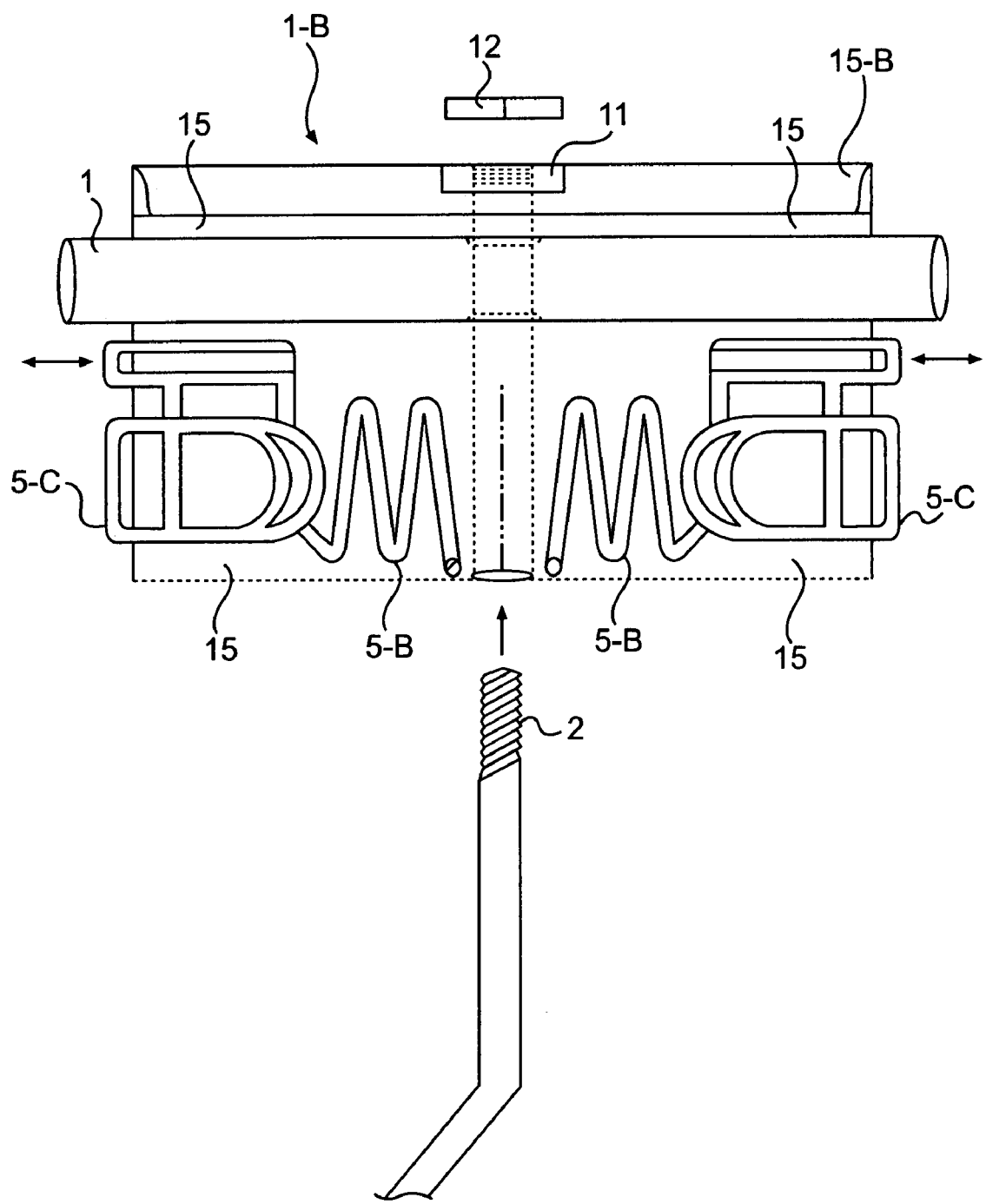
FIG. 6 is a side elevational, partially cut-away view of an alternate support structure assembly 1-B, detailing internal mechanical components.

FIG. 6 details an alternate support structure assembly, 1-b. The assembly is mounted to the perimeter frame of the article by at least one pivot, 1. A support shaft of any suitable shape, 2, mounts in a perpendicular orientation to the pivot, 1, and interconnects to the pivot. Any suitable interconnection between the pivot, 1, and the support shaft, 2 is appropriate. This embodiment, in ghost perspective, provides that the support shaft, 2 interconnects traveling through a hole or cavity in the pivot, 1, and then the upper portion of the support shaft, 2 is secured to the pivot, 1, at the area noted as 11, with any suitable terminal fixing member, 12. FIG. 6 shows only a portion of a support case, 15, which may be a box like multi-walled case, or may only have a multiplicity of walls (not shown). Also, this alternate support structure assembly, 1-b, may or may not include a cover, shown as 15-b. In this figure alternate support structure assembly, 1-b includes at least one alternate latch member, 5-b, although this embodiment shows a pair of latches. Latch 5-b provides for spring biasing and generally latitudinal latching between the support structure assembly and the article perimeter frame, 16. The latch, 5-b includes a spring biased portion, as well as an open area forming a finger grip, and a finger portion, 5-c. The finger portion, 5-c engages any suitable opening or cavity in the article perimeter frame, 16 (not shown here), latching the support structure assembly 1-b when in the operative, use position. To affect release, the user manually manipulates the latch 5-b, moving the finger portion, 5-c. towards the center of the support structure assembly, 1-b to allow the entire support structure assembly to be pivoted and moved to a stowed, compact position, where the assembly is stowed closely adjacent to the side elevational profile of the article. It is appreciated at the alternate latch, 5-*b* is shown as a single, integrated component, which incorporates spring biasing, a finger grip portion, as well as a latch finger, which interacts with a portion of the article perimeter frame, 16. This latch component **5-*b* may instead be manufactured with separate parts. Further, in FIG. 6, the latch is shown as being situated entirely below the pivot, 1. Instead it may be a formed portion, partly surrounding, or immediately adjacent to, the pivot, 1**.

In several figures, the support structure assembly embodiments were shown inside a support case, 15. The support structure assemblies need not have this type of enclosed case at all. Instead, referring to FIG. 1, the support structure assembly, **1-*a* may be constructed with the oppositely extending mounting elements or pivot, 1, with the latitudinally directed support shaft, 2, and the latch, 5. The support structure assembly, 1-*a* will fully function in this configuration without a support case, 15. Alternatively, the case may be omitted, but a shaped latch faceplate primary release, 7 may be mounted to the exterior of the assembly, 1-*a* creating less than an enclosed case. The faceplate may not be in one plane, as shown in FIG. 1, but may be shaped in any other suitable shape in replacement of outward wall of the support case, as shown in FIG. 5. The support structure assembly mechanical strength does not depend on inclusion of any support case, 15. Further, the application discloses two different assemblies, 1-A and 1-B. The components of either assembly may be mixed and matched, and the latches disclosed in one embodiment may be adapted to the other, and vice versa. Also, FIG. 2 discloses at least three alternate locking/latching means for the support structure assembly (in addition to the other latching disclosed) and any of these alternate or secondary locking/latching means may instead be the primary locking/latching means of the overall support structure assemblies, 1-A or 1-B** rather than serve as the secondary locking/latching means, thereby supplanting the "primary" latch method described.

What is claimed is:

1. A support structure assembly operable with a supported article comprising:
   latching means; and
   at least one article perimeter frame portion defining a side elevational profile, as well as at least one support structure assembly receiving cavity, formed out of open space in the perimeter frame portion thickness, which receives at least one support structure assembly, and
   the support structure assembly including a plurality of support surfaces perpendicular to at least one lower base portion, defining a support structure assembly periphery with interconnected components substantially recessed within said periphery; and the support structure assembly's interconnected components further include both support structure assembly mounting means and support stand shaft attaching means interconnected to at least one support stand shaft; at least partly within the support structure assembly periphery are transversely disposed, oppositely extending mounting elements, which occupy adjacent portions of the article perimeter frame portion, about which the support structure assembly pivots, the support stand shaft enters the lower base portion of the support structure assembly periphery; and
   in the first operative position of the support structure assembly the associated support stand shaft is orthogonal to the article perimeter frame providing support, and the periphery of the support structure assembly substantially occupies the support structure assembly receiving cavity; and at least one male-female connection between the latching means and the article perimeter frame positively latches the support structure assembly to the perimeter frame in the first operative position, and
   in a second, stowed position of the support structure assembly, the latching means male-female connection between the support structure assembly and the article perimeter frame is released, the support stand shaft attaching means and the interconnected at least one support stand shaft of the support structure assembly are swept through an angle during movement of said support structure assembly between the first and second positions such that the plane defined by the support structure assembly and interconnected support stand shaft in the second position extends substantially parallel with the side elevational profile of the article perimeter frame and is located within the article's perimeter frame, and
   manual movement of the support structure assembly from the second, stowed position, back to the first, operative position, positioning the support structure assembly in contiguous orientation to the support structure assembly receiving cavity, provides the automatic engagement of the male-female connection between the latching means and the article perimeter frame.

2. The support structure assembly of claim 1, wherein spring biasing means interact with at least one of the oppositely extending mounting elements, and when at least one latch is released from engagement status of the first position, the spring biasing causes the support structure assembly to be swept through an angle to the stowed status of the second, stowed position.

3. The support structure assembly of claim 1, wherein the support stand shaft freely rotates 360 degrees along the vertical axis of the stand shaft.

4. The support structure assembly of claim 1, wherein the latch includes at least one shaped portion providing a finger grip, and manual movement of the at least one latch finger grip, releases the male-female connection between the support structure assembly and article perimeter frame.

5. The support structure assembly of claim 1, wherein at least one surface of the support structure assembly includes an access area, and at least one latch is recessed at least partly within the support structure assembly periphery and includes at least one shaped portion providing a finger grip, and a face plate component, defining at least one latch connector and at least one retaining means connecting the face plate to a surface of the support structure assembly and also including at least one shaped face plate grip portion, and manual movement of the at least one face plate shaped finger grip portion releases the male-female latch connection between the support structure assembly and the article perimeter frame, at least in the said first, operative position.

6. The support structure assembly of claim 1, wherein at least one wheel is attached to the support stand shaft providing rolling support to the supported article.

7. A support structure assembly operable with a supported article comprising:
   at least one article perimeter frame portion defining a side elevational profile, as well as at least one support structure assembly receiving cavity, formed out of open space in the perimeter frame portion thickness, which receives at least one support structure assembly, and
   the support structure assembly including a plurality of support surfaces perpendicular to at least one lower base portion, defining a support structure assembly periphery with interconnected components substantially recessed within said periphery; and the support structure assembly's interconnected components further include both support structure assembly mounting means and support stand shaft attaching means interconnected to at least one support stand shaft; at least partly within the support structure assembly periphery are transversely disposed, oppositely extending mounting elements, which occupy adjacent portions of the article perimeter frame portion, about which the support structure assembly pivots, the support stand shaft enters the lower base portion of the support structure assembly periphery; and mounted at least partly to the support stand shaft and to the support structure assembly is a latch; and in the first operative position of the support structure assembly the associated support stand shaft is orthogonal to the article perimeter frame providing support, and the periphery of the support structure assembly substantially occupies the support structure assembly receiving cavity; and at least one male-female connection between the latch and the article perimeter frame positively latches the support structure assembly to the perimeter frame in the first operative position, and in a second, stowed position of the support structure assembly, the latch male-female connection between the support structure assembly and the article perimeter frame is released, the support stand shaft attaching means and the interconnected at least one support stand shaft of the support structure assembly are swept through an angle during movement of said support structure assembly between the first and second positions such that the plane defined by the support structure assembly and interconnected support stand shaft in the second position extends substantially parallel with the side elevational profile of the article perimeter frame and is within the article's perimeter frame; and at least one surface of the support structure assembly periphery includes an access area providing finger access to the latch, and the latch includes at least one shaped portion providing a finger grip, and manual movement of the at least one latch finger grip releases the male-female connection between the support structure assembly and the article perimeter frame.

8. The support structure assembly of claim 7, wherein spring biasing means interact with at least one of the oppositely extending mounting elements, and when at least one latch is released from engagement status of the first position, the spring biasing causes the support structure assembly to be swept through an angle to the stowed status of the second, stowed position.

9. The support structure assembly of claim 7, including a face plate component, defining at least one latch connector and at least one retaining means connecting the face plate to a surface of the support structure assembly and also including at least one shaped face plate grip portion, and manual movement of the at least one face plate shaped finger grip portion releases the male-female latch connection between the support structure assembly and the article perimeter frame, at least in the said first, operative position.

10. The support structure assembly of claim 7, wherein at least one wheel is attached to the support stand shaft providing rolling support to the supported article.

11. The support structure assembly of claim 7, wherein manual movement of the support structure assembly, from the second, stowed position, to the first, operative position, positioning the support structure assembly in contiguous orientation to the support structure assembly receiving cavity, provides the automatic engagement of the male-female connection between the latch and the said planar surface.

12. A support structure assembly operable with a supported article comprising:

at least one article perimeter frame portion defining a side elevational profile and a planar surface, as well as at least one support structure assembly receiving cavity, formed out of open space in the perimeter frame portion thickness, which receives at least one support structure assembly defining a periphery with an interconnected support stand shaft; and the support structure assembly further includes both support structure assembly mounting means and support stand shaft attaching means interconnected to at least one support stand shaft; at least partly within the support structure assembly periphery are transversely disposed, oppositely extending mounting elements, which occupy adjacent portions of the article perimeter frame portion, about which the support structure assembly pivots, and in the first operative position of the support structure assembly the associated support stand shaft is orthogonal to the article perimeter frame providing support, and the periphery of the support structure assembly substantially occupies the support structure assembly receiving cavity; and in a second, stowed position of the support structure assembly, the support stand shaft attaching means and the interconnected at least one support stand shaft of the support structure assembly are swept through an angle during movement of said support structure assembly between the first and second positions such that the plane defined by the support structure assembly and interconnected support stand shaft in the second position extends substantially parallel with the side elevational profile of the article perimeter frame and within the article's perimeter frame; and latching means which positively latch the support structure assembly against movement when in the first position, which latching means engages a portion of the article perimeter frame portion and a portion of the support structure assembly.

13. The support structure assembly of claim 12, wherein spring biasing means interact with at least one of the oppositely extending mounting elements, and when at least one latch is released from engagement status of the first position, the spring biasing causes the support structure assembly to be swept through an angle to the stowed status of the second, stowed position.

14. The support structure assembly of claim 12, wherein manual movement of the support structure assembly, from the second, stowed position, to the first, operative position, positioning the support structure assembly in contiguous orientation to the support structure assembly receiving cavity, provides the automatic engagement of the male-female connection between the latch and the said planar surface.

15. The support structure assembly of claim 12, wherein at least one wheel is attached to the support stand shaft providing rolling support to the supported article.

16. The support structure assembly of claim 15, wherein a ground engaging wheel stand is selectively retained to, and selectively removable from, at least one part of the at least one wheel, and a portion of the wheel stand engages the ground surface in the retained status, preventing rolling movement of the wheel along the ground.

17. The support structure assembly of claim 12, wherein the support stand shaft includes a ground engaging ski.

18. The support structure assembly of claim 12, wherein the support stand shaft is extensible and retractable in a vertical plane between the article perimeter frame and the support surface.

19. The support structure assembly of claim 12, wherein shock absorbing means mounted at least partly to the support stand shaft reduces vibration received by the supported article.

20. The support structure assembly of claim 12, wherein the support stand shaft is fixated to prevent rotation along the vertical axis of the support stand shaft by a shaped portion of the support stand shaft contacting a corresponding shaped portion of the support structure assembly, preventing axial rotation of the support stand shaft along the vertical axis.

21. The support structure assembly of claim 12, wherein one planar surface of the article perimeter frame includes a cavity, and in the first, operative position of the support structure assembly, at least part of the support stand shaft occupies the cavity, and in the second, stowed position, the support stand shaft does not occupy the cavity.

22. The support structure assembly of claim 12, wherein at least one surface of the support structure assembly includes an access area, and the latch is recessed at least partly within the support structure assembly periphery and includes at least one shaped portion providing a finger grip, and a face plate component, defining at least one latch connector and at least one retaining means connecting the face plate to a surface of the support structure assembly and also including at least one shaped face plate grip portion, and manual movement of the at least one face plate shaped finger grip portion releases the male-female latch connection between the support structure assembly and the article perimeter frame.

23. The support structure assembly of claim 12, wherein at least one latching means includes an operative position where the latching means prevents release of the male-female connection between the latch and the article perimeter frame, and in a second, inoperative position, the at least one latching means does not prevent release of the male-female latch connection.

* * * * *